United States Patent
Raab et al.

(10) Patent No.: US 8,365,527 B2
(45) Date of Patent: Feb. 5, 2013

(54) DRIVE UNIT WITH COOLING CIRCUIT AND SEPARATE HEAT RECOVERY CIRCUIT

(75) Inventors: Gottfried Raab, Perg (AT); Markus Raup, Attnang-Puchheim (AT); Josef Klammer, Lienz (AT)

(73) Assignee: MAN Nutzfahrzeuge Oesterreich AG, Steyr (AT)

( * ) Notice: Subject to any disclaimer, the term of this patent is extended or adjusted under 35 U.S.C. 154(b) by 566 days.

(21) Appl. No.: 12/633,217

(22) Filed: Dec. 8, 2009

(65) Prior Publication Data

US 2010/0139626 A1    Jun. 10, 2010

(30) Foreign Application Priority Data

Dec. 10, 2008   (AT) ................. A 1921/2008

(51) Int. Cl.
| | |
|---|---|
| F02B 29/04 | (2006.01) |
| F02B 33/44 | (2006.01) |
| F02B 33/00 | (2006.01) |
| F02B 47/08 | (2006.01) |
| F01P 9/00 | (2006.01) |
| F01P 7/02 | (2006.01) |
| F02M 25/07 | (2006.01) |

(52) U.S. Cl. ........ 60/599; 60/605.2; 60/612; 123/41.01; 123/41.05; 123/562; 123/563; 123/568.12

(58) Field of Classification Search ............... 60/599, 60/605.1, 605.2, 612; 123/41.01, 41.05, 123/562, 563, 568.12
See application file for complete search history.

(56) References Cited

U.S. PATENT DOCUMENTS

| | | | | |
|---|---|---|---|---|
| 6,883,314 | B2 * | 4/2005 | Callas et al. | 60/599 |
| 2008/0066697 | A1 * | 3/2008 | Raab et al. | 123/41.55 |
| 2008/0087238 | A1 * | 4/2008 | Held et al. | 123/41.48 |

FOREIGN PATENT DOCUMENTS

| | | |
|---|---|---|
| DE | 10 2006 010 247 | 9/2007 |
| WO | WO 2009002233 A1 * | 12/2008 |

* cited by examiner

*Primary Examiner* — Kenneth Bomberg
*Assistant Examiner* — Audrey K Bradley
(74) *Attorney, Agent, or Firm* — Cozen O'Connor (57) ABSTRACT

A cooling circuit and an independent heat recovery circuit are associated with an internal combustion engine. A coolant is circulated a pump in a first and a second cooling sub-circuit. An increase in pressure in a work medium is achieved within the heat recovery circuit by a pump. This work medium is changed from liquid aggregate state to vaporous aggregate state and back to the liquid aggregate state in heat exchangers. This work medium is divided after the pump into two parallel partial flows and is changed into vaporous state in a first parallel branch in an EGR heat exchanger through which recycle exhaust gas flows and in a second parallel branch in an exhaust gas heat exchanger through flow exhaust gas downstream of the low-pressure turbine flows. This vaporous work medium is then fed to an expander and is then conducted through a cooled condenser and, liquefied again.

27 Claims, 7 Drawing Sheets

DRIVE UNIT WITH COOLING CIRCUIT AND SEPARATE HEAT RECOVERY CIRCUIT

BACKGROUND OF THE INVENTION

1. Field of the Invention

The invention is directed to a drive unit, particularly in a motor vehicle, with an internal combustion engine that is charged in two stages by two exhaust turbochargers and which has a charge air supply having a low-pressure compressor, a high-pressure compressor, an intermediate charge air cooler arranged between the low-pressure compressor and the high-pressure compressor, and a main charge air cooler downstream of the high-pressure compressor. The drive unit has an exhaust gas discharge including a high-pressure turbine, a low-pressure turbine and an exhaust gas aftertreatment device downstream in the exhaust train, and a cooling installation with a cooling circuit and a heat recovery circuit, which is hydraulically decoupled from the latter.

2. Description of the Related Art

A drive unit is disclosed in DE 10 2006 010 247 A1. A feature of this known drive unit is that its first cooling circuit and its second cooling circuit, which functions as a heat recovery circuit, are in thermal contact via at least one heat transfer device. For example, an EGR cooler and an exhaust gas heat exchanger arranged downstream in the exhaust train of an exhaust gas aftertreatment device are provided as heat transfer devices and are arranged in this sequence successively, i.e., in series one behind the other, in the second cooling circuit and, therefore, transfer thermally coupled heat to a work medium flowing through the second cooling circuit. The work medium of the second cooling circuit is heated as it flows through the EGR heat exchanger and then through the exhaust gas heat exchanger, changed at least partially into its vaporous aggregate state, and superheated. The work medium is then used in an expander to produce useful power. The work medium then flows in the second cooling circuit through at least one air-cooled condenser and then, again in liquefied aggregate state, through the main charge air cooler and intermediate charge air cooler and possibly through additional heat exchangers. Accordingly, in this known system, both the charge air and the engine cooling water are used in addition to the exhaust gas as heat sources which are connected in series, one behind the other, and receive the heat of the respective work media.

Further studies have shown that the expander only starts to work efficiently at high pressures. However, with a serial flow through the above-mentioned heat exchangers the temperatures of the charge air, engine coolant and exhaust gas are not sufficient to evaporate the work medium at high pressures. It must be considered in this respect that the charge air which is compressed in two stages and the internal combustion engine must both be sufficiently cooled in all performance ranges to ensure an advantageous operation of the combustion engine and to prevent its overheating. Therefore, large quantities of work medium must be pumped through the second cooling circuit in the known system, with the result that this amount of work medium cannot be completely vaporized even by the heat of higher-output heat sources when flowing through the latter so that a separation system for the liquid phase is mandatory. Further, because of these factors, the returned exhaust gas cannot be cooled to the desired low temperature level when flowing through the one or more EGR heat exchangers because the work medium is already preheated when entering the one or more EGR heat exchangers.

SUMMARY OF THE INVENTION

It is an object of the present invention to improve the drive device known from DE 10 2006 010 247 A1 and its cooling system such that the combustion engine, charge air, and the recycle exhaust gas can be efficiently cooled, and a highly efficient heat recovery can be achieved by making better use of the heat source exhaust gas.

According to one embodiment the invention, a cooling circuit with two cooling sub-circuits and a heat recovery circuit hydraulically decoupled from the latter is associated with the drive unit. The cooling circuit is divided into two cooling sub-circuits that are either hydraulically coupled with one another or hydraulically separated. A coolant can be circulated through these cooling sub-circuits by at least one pump. A heat exchanger, which can be cooled by ambient air, is arranged in the first cooling sub-circuit, and another heat exchanger, which can be cooled by ambient air arranged in the second cooling sub-circuit. The main charge air cooler and intermediate charge air cooler are arranged in the second cooling sub-circuit, downstream of the heat exchanger of the second cooling sub-circuit. Further, an increase in pressure and circulation of a work medium can be achieved within the heat recovery circuit by at least one pump. The pressure increase and circulation causes a phase transition of the work medium from liquid aggregate state to vaporous aggregate state and back from vaporous aggregate state to liquid aggregate state in heat exchangers. The work medium is divided after the pump into two parallel partial flows and is thereby changed into vaporous aggregate state in a first parallel branch in an EGR heat exchanger through which returning exhaust gas flows and in a second parallel branch in an exhaust gas heat exchanger through which can flow exhaust gas given downstream of the low-pressure turbine in the exhaust train. This vaporous work medium is then fed to an expander and converted in the expander by corresponding expansion into useful mechanical energy. The work medium is then changed into its liquid aggregate state as it flows through a cooled condenser and fed back into the heat recovery circuit by the pump.

By the inventive concept of providing two parallel heat exchangers, i.e., an EGR heat exchanger and an exhaust gas heat exchanger serving to evaporate the work medium, steam can be generated immediately using one respective heat source. In addition, the work medium enters each of the two heat exchangers at a low temperature and, therefore, also achieves the desired highly efficient cooling effect for the medium from which the heat is extracted (recycled exhaust gas and exhaust gas before exiting into the atmosphere). Another advantage is that only the heat of the useful steam need be discharged in the condenser. Therefore, according to the invention, the exhaust gas heat energy available in the heat recovery circuit in the two heat exchangers, which are connected in parallel, is converted in an optimal manner for the steam energy that can then be converted by the expander into useful mechanical energy to the maximum extent. This mechanical energy can be converted by the expander, e.g., into rotational energy and supplied, to the internal combustion engine to boost output or to a generator for generating electrical energy with a correspondingly high performance yield.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

To facilitate understanding, identical or corresponding structural components or parts thereof are designated by the same reference numbers in the drawings.

The invention is associated with a drive unit whose principal part is an internal combustion engine 1 which in turn forms the drive source for a motor vehicle, any kind of utility vehicle, rail-borne vehicle, watercraft, or in stationary installations such as cogeneration plants, emergency power units, and other known or hereafter developed installations.

The internal combustion engine 1 is charged in two stages by two exhaust gas turbochargers 2, 3. The exhaust turbocharger 2 forming the low-pressure stage comprises a low-pressure turbine 2/1 and a low-pressure compressor 2/2 driven by the low-pressure turbine 2/1. The exhaust turbocharger 3 forming the high-pressure stage comprises a high-pressure turbine 3/1 and a high-pressure compressor 3/2 driven by the high-pressure turbine 3/1.

The exhaust gas is discharged by the internal combustion engine 1 through an exhaust train 4 starting from headers 4a, which proceed from the engine side and communicate with an exhaust train segment 4b connected to the inlet of the high-pressure turbine 3/1. The latter communicates with the inlet of the low-pressure turbine 2/1 by an exhaust train segment 4c. Adjoining the outlet of the low-pressure turbine 2/1 is an exhaust train segment 4d in which an exhaust gas aftertreatment device 5 can be arranged.

The charge air feed of the internal combustion engine 1 comprises the low-pressure compressor 2/2 which draws air from the atmosphere through a filter 6 and charge air line segment 7a, a charge air line segment 7b between the low-pressure compressor 2/2 and high-pressure compressor 3/2 with an intermediate charge air cooler 8 arranged therein, and a main charge air cooler 9 arranged downstream of the high-pressure compressor 3/2. A charge air line segment 7c leads to the main charge air cooler 9 and a charge air line segment 7d leads away from the main charge air cooler 9, this charge air line segment 7d communicating with the air inlets 7e of the internal combustion engine 1 or a charge air collector line 7f from which the air inlets 7e proceed.

The drive unit has a cooling circuit 10 with two cooling sub-circuits 10/1, 10/2 and a hydraulically decoupled heat recovery circuit 11, which is independent from the cooling circuit 10. In the cooling circuit 10 according to FIGS. 1 to 3, a coolant, e.g., typically water mixed with antifreeze, is circulated by at least one pump 12 in the first cooling sub-circuit 10/1 and in the second cooling sub-circuit 10/2 which is hydraulically coupled with the cooling sub-circuit 10/1. In another construction of the invention, the cooling sub-circuits 10/1 and 10/2 are hydraulically decoupled, and a coolant is circulated in each by a respective pump. In the example according to FIG. 4, coolant is circulated in the cooling sub-circuits 10/1 and 10/2 by a two-stage pump 12' with stages 12/1 and 12/2. One stage 12/1 or 12/2 of the pump 12' is associated with each cooling sub-circuit. The first cooling sub-circuit 10/1 is the high-temperature engine cooling circuit in which is arranged a heat exchanger 13 (high-temperature water cooler) which can be cooled by ambient air. In the latter case, a cooling circuit segment 10/1a leads from the coolant outlet of the internal combustion engine 1 and a cooling circuit segment 10/1b leading to the pump 12 proceeds from the heat exchanger 13, and the pump 12 is connected to the coolant inlet of the internal combustion engine 1 by a cooling circuit segment 10/1c. A regulating member 14 which communicates with the cooling circuit segment 10/1b via a bypass line 15 is installed in the cooling circuit segment 10/1a regulates the flow through the heat exchanger 13. Another heat exchanger 16 (low-temperature water cooler), which can be cooled by ambient air and downstream of the heat exchanger 13, the main charge air cooler 9 and intermediate charge air cooler 8 are arranged in the second cooling sub-circuit 10/2 which is a low-temperature cooling circuit. In the hydraulically coupled cooling sub-circuits 10/1 and 10/2 according to the examples shown in FIGS. 1 to 3, a cooling circuit segment 10/2a branches off from the cooling circuit segment 10/1c of the first cooling sub-circuit 10 after the pump 12 with respect to flow and leads to the heat exchanger 16. A cooling circuit segment 10/2b adjoins the output of the heat exchanger 16, the main charge air cooler 9 and the intermediate charge air cooler 8 being arranged therein so as to be connected either in series one after the other or preferably in parallel, in a parallel branch segment 10/2c and 10/2d, respectively. After the intermediate charge air cooler 8, with respect to flow, the second cooling sub-circuit 10/2 continues with a segment 10/2e. The continuation toward the rear will be discussed more fully.

The heat recovery circuit 11 according to the invention will now be described. An increase in pressure and circulation of a work medium can be achieved in the heat recovery circuit 11 by a pump 17. In so doing, a phase transition of the work medium from liquid aggregate state to vaporous aggregate state and from vaporous aggregate state to liquid aggregate state can be carried out in the heat exchangers 18, 19, 20. For this purpose, this work medium is divided into two parallel partial flows following the pump 17 with respect to flow and is changed to vaporous aggregate state in a first parallel branch 11a in an EGR heat exchanger 18 through which exhaust gas to be recycled flows and in a second parallel branch 11b in an exhaust gas heat exchanger 19 through which exhaust gas flows that is given off downstream of the low-pressure turbine 2/1 in the exhaust train segment 4d. After the two parallel branches 11a, 11b reunite, this vaporous work medium, which is also under high pressure, is then fed to an expander 21 via a cooling circuit segment 11c, which is now shared, and converted into useful mechanical energy by the expander 21. The expanded work medium is then fed to a cooled condenser 20 via a cooling circuit segment 11d following the output of the expander 21 and is returned to its liquid aggregate state again as it passes through the cooled condenser 20. It is then drawn through a cooling circuit segment 11e by the pump 17 and fed once again into the heat recovery circuit 11 described above.

Figure 3:
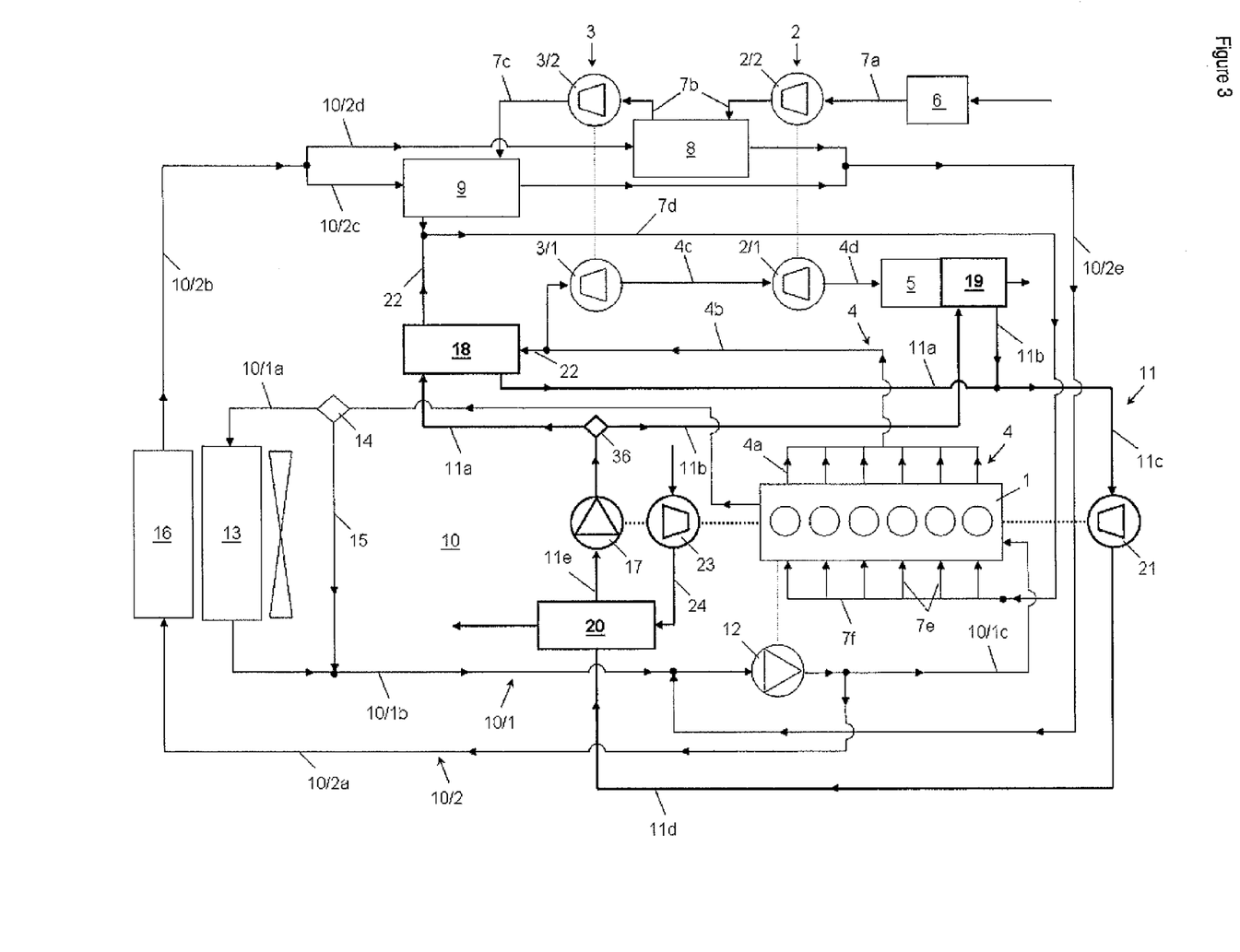
FIG. 3 is a schematic diagram of a third embodiment of the invention.
Figure 4:
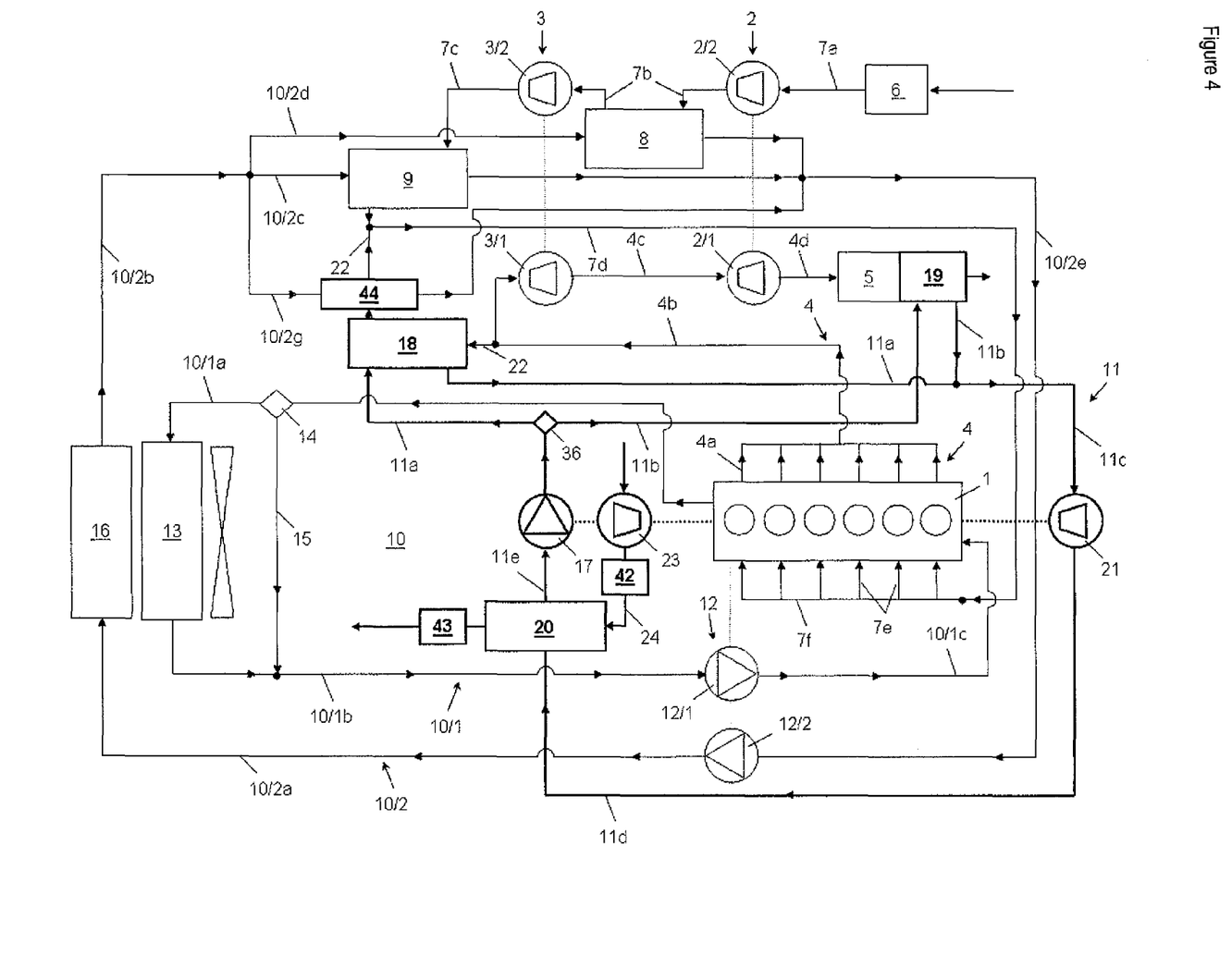
FIG. 4 is a schematic diagram of a fourth embodiment of the invention.

The recycle exhaust gas flowing through the EGR heat exchanger 18 is fed to the EGR heat exchanger 18 before the high-pressure turbine 3/1 with respect to flow via an EGR line 22 branching off from the exhaust train segment 4b and, after flowing through the EGR heat exchanger 18 and another heat exchanger 44 arranged downstream of heat exchanger 18, is fed into the charge air given off at the output of the main charge air cooler 9 (FIG. 4). Following the EGR heat exchanger 18 with respect to flow—and the additional heat exchanger 44, if any—the EGR line 22 either opens into that charge air line segment 7d which forms the connection between the main charge air cooler 9 and the engine-side air inlets 7e or charge air collector line 7f (see FIGS. 1 and 3) or is returned directly to the air inlets 7e of the internal combustion engine or a charge air collector line 7f from which the air inlets 7e proceed (see FIG. 2).

Different constructions and connection arrangements of the cooling circuits according to the invention will be discussed in more detail in the following referring to the individual drawings.

Figure 1:
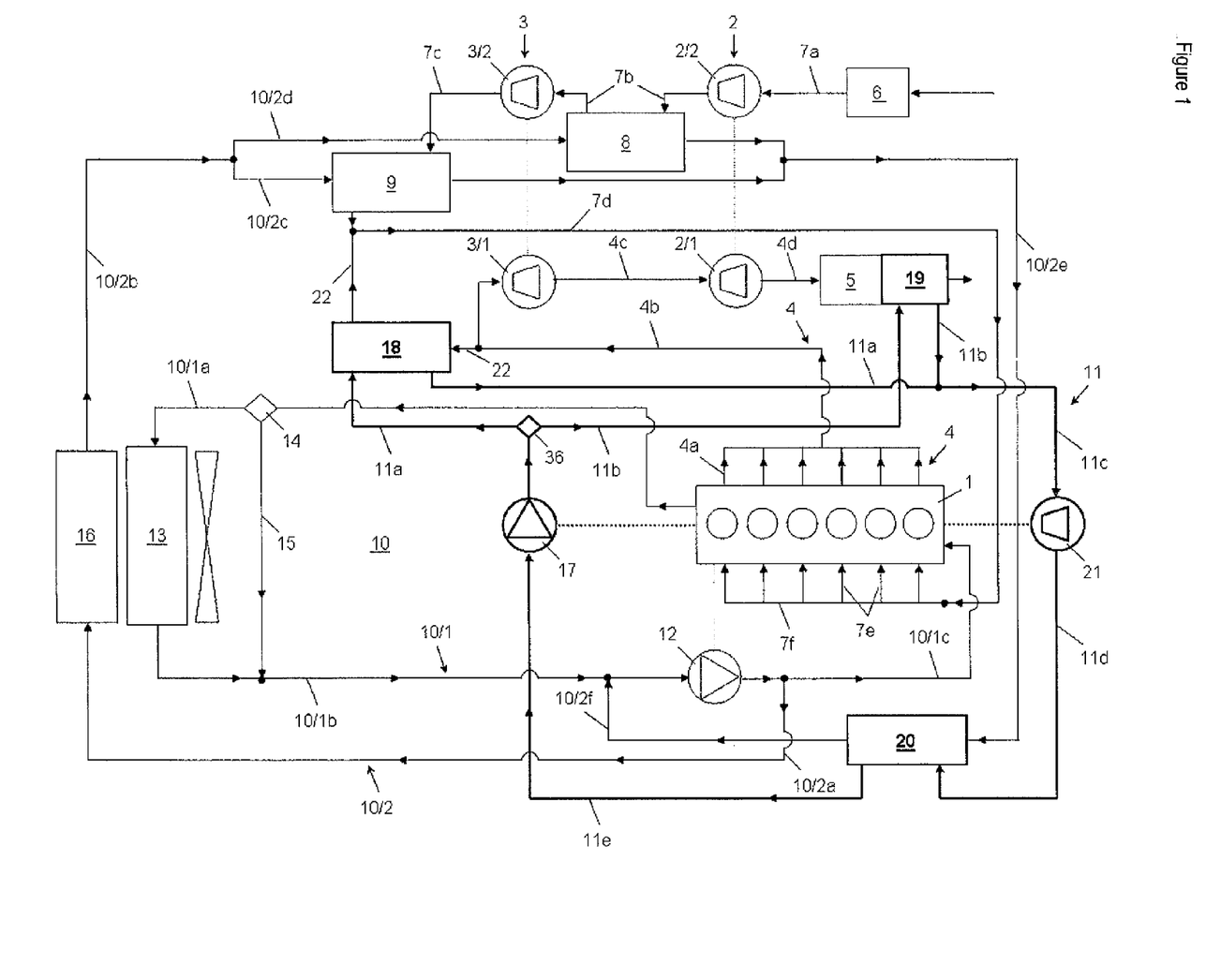
FIG. 1 is a schematic diagram of a first embodiment of the invention.

In the embodiment according to FIG. 1, the condenser 20 of the heat recovery circuit 11 is connected for cooling in the second cooling sub-circuit 10/2. The line segment 10/2e leads to the condenser 20. A line segment 10/2f of the second cooling sub-circuit 10/2 continues from the output of the condenser 20 and opens again into the first cooling sub-circuit 10/1, namely, in its line segment 10/1b, in front of the pump 12 with respect to flow or on the suction side of the pump 12. Accordingly, the coolant of the low-temperature cooling sub-circuit 10/2, after it has absorbed the heat of the charge air flow in the two charge air coolers 8, 9, which are preferably connected in parallel, serves as medium for cooling and re-liquefying the work medium in the condenser 20. The heat carried off in the condenser 20 loads the cooling system of the internal combustion engine 1, but a portion of the absorbed heat is converted again into mechanical energy and only a certain portion is introduced into the cooling system. Accordingly, the engine cooling system can be either unloaded—particularly at high ambient temperatures—or maintained neutral or—particularly when there is a surplus of cooling potential at low ambient temperatures—additionally loaded.

Figure 2:
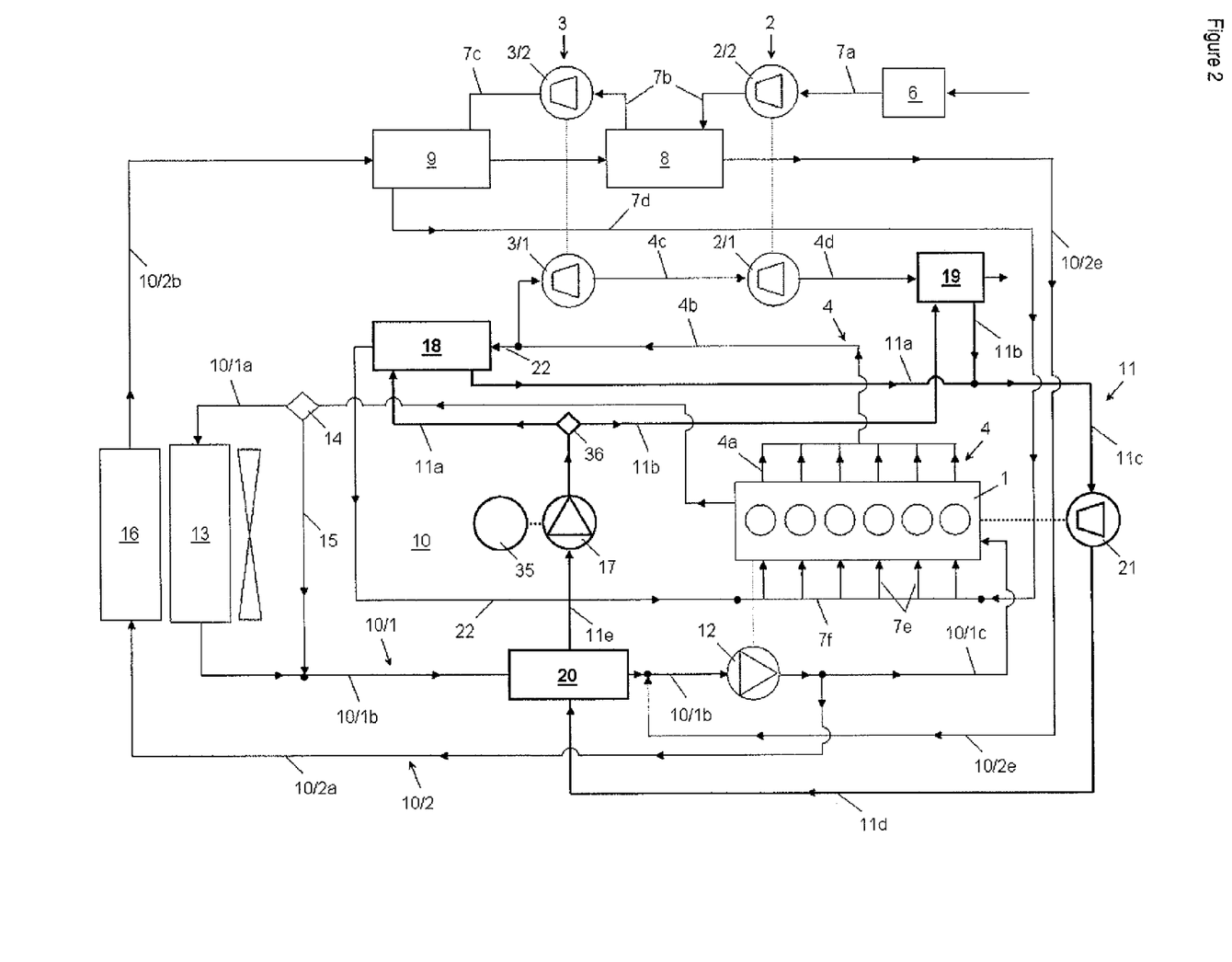
FIG. 2 is a schematic diagram of a second embodiment of the invention.

In the embodiment according to FIG. 2, the condenser 20 is connected for cooling in the first cooling sub-circuit 10/1, specifically in that line segment 10/1b between high-temperature heat exchanger 13 and the pump 12 through which cooled coolant flows. In this case, the second cooling sub-circuit 10/2 opens with its line segment 10/2e into the first cooling sub-circuit 10/1, namely into its line segment 10/1b, in front of the pump 12 with respect to flow or on the suction side of the pump 12, but after the condenser 20.

In this case, the coolant of the high-temperature cooling sub-circuit 10/1 after flowing through the high-temperature heat exchanger 13 serves as medium for cooling and re-liquefying the work medium in the condenser 20. This variant requires condensation at higher temperatures and higher pressures compared with FIG. 1, but in this case the system is less prone to overheating during dynamic changes in speed and load due to the greater amounts of coolant flowing through.

In the variant according to FIG. 3, compressed air is used to cool the condenser 20 and to cool and liquefy the work medium flowing through the condenser 20. An additional compressor or fan 23, which draws air from the atmosphere, generates the compressed air, the compressed air is fed to the condenser 20 via feed line 24. The compressor or fan 23 can be driven by the internal combustion engine 1 by a corresponding gear train or drive train or, alternatively, by an electric motor.

In the constructional variant according to FIG. 4, at least one additional heat transfer device 42, 43 is located in the feed line 24 upstream of the condenser 20 and/or downstream of the latter in contrast to FIG. 3. Depending on the required temperature level of a cooling air flow, an additional cooling action can be brought about, for an air conditioner condenser, with the compressed air, which can be generated by an additional compressor or fan 23 which draws air from the atmosphere. Compared to the variants in FIGS. 1 to 3, FIG. 4 shows the construction of the hydraulically decoupled cooling sub-circuits 10/1, 10/2 in which a coolant can be circulated by at least one associated stage 12/1, 12/2 of the pump 12'. Further, FIG. 4 shows a special arrangement of the additional heat exchanger 44 which is hydraulically connected in a parallel flow 10/2g to the branches 1012d, 10/2c of the second cooling sub-circuit 10/2 which flow through the charge air cooler 8, 9. Therefore, on the exhaust gas side, the exhaust gas flowing through the EGR line 22 can be cooled to a lower temperature level by the additional heat exchanger 44 after exiting the EGR evaporator 18.

As concerns the arrangement of the exhaust gas heat exchanger 19, various possibilities are shown for this in FIGS. 1 to 4 and 7 to 10.

FIG. 2 shows an embodiment form in which the exhaust gas heat exchanger 19 is moved close to the low-pressure turbine 2/1 in the exhaust train segment 4d adjoining the latter so as to use the residual heat of the exhaust gas exiting the turbine 2/1.

Figure 8:
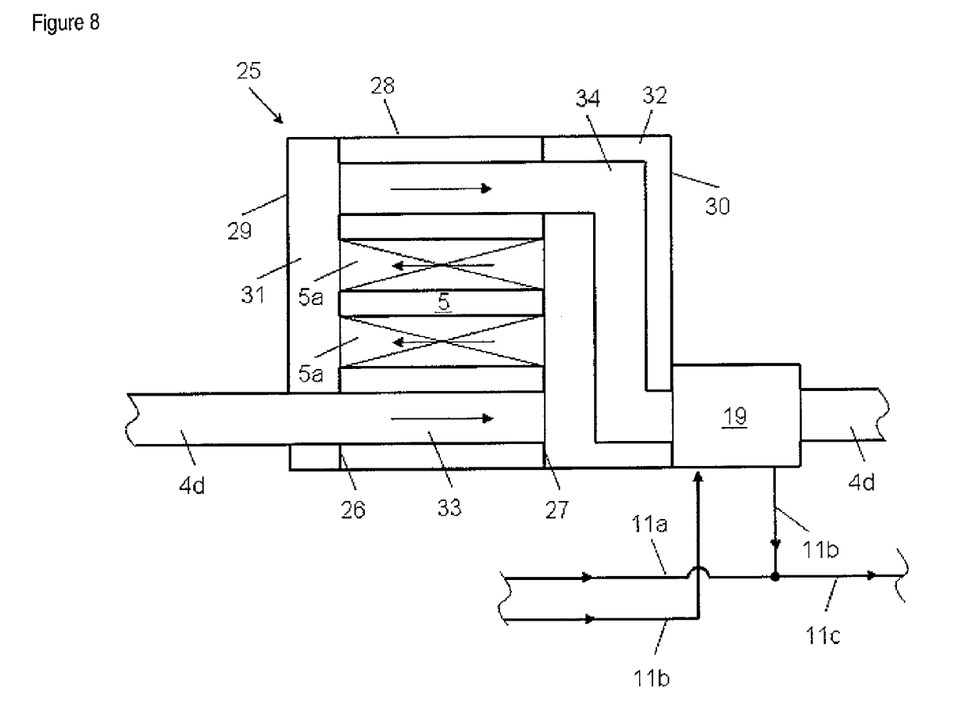
FIG. 8 is an alternative arrangement to FIG. 7 for the exhaust gas heat exchanger in the exhaust train.

FIGS. 1, 3 and 4 show an embodiment in which the exhaust gas heat exchanger 19 is arranged in the exhaust train segment 4d adjoining the output of the low-pressure turbine 2/1, downstream of an exhaust gas aftertreatment device 5 such that it uses the residual heat of this exhaust gas exiting after flowing through. The exhaust gas aftertreatment device 5 and the exhaust gas heat exchanger 19 are arranged directly behind one another. In the variant according to FIG. 7, the exhaust gas heat exchanger 19 is arranged at a distance from the exhaust gas aftertreatment device 5 in the exhaust train segment 4d. FIG. 8 shows a certain embodiment form of an exhaust gas aftertreatment device 5 and the exhaust gas heat exchanger 19 associated with it. A plurality of exhaust gas aftertreatment modules 5a of the exhaust gas aftertreatment device 5 are installed in a muffler 25 and are held there parallel to one another in the installed position between two walls 26, 27 such that a flow can pass through. The muffler 25 is defined on the radial outer side by an outer wall 28, e.g., a cylindrical outer wall 28, and in the front and rear by a base 29, 30, respectively. The two walls 26, 27 are arranged parallel to the bases 29, 30. The wall 26 together with the front base 29 defines an exhaust gas outlet space 31, and wall 27 together with the rear base 30 defines an exhaust gas inlet space 32. An inlet connection piece 33, which forms part of the exhaust train segment 4d opens into the exhaust gas inlet space 32 and introduces exhaust gas into the inlet space 32. This exhaust gas then flows through the exhaust gas aftertreatment modules 5a so as to be cleaned, then is conducted out of the outlet space 31 and the muffler 25 via an end pipe 34 internal to the muffler, and then flows through the exhaust gas heat exchanger 19 which is mounted directly on the outer side of the muffler 25 in this example. This exhaust gas heat exchanger 19 is fastened to the rear base 30 of the muffler 25.

Figure 9:
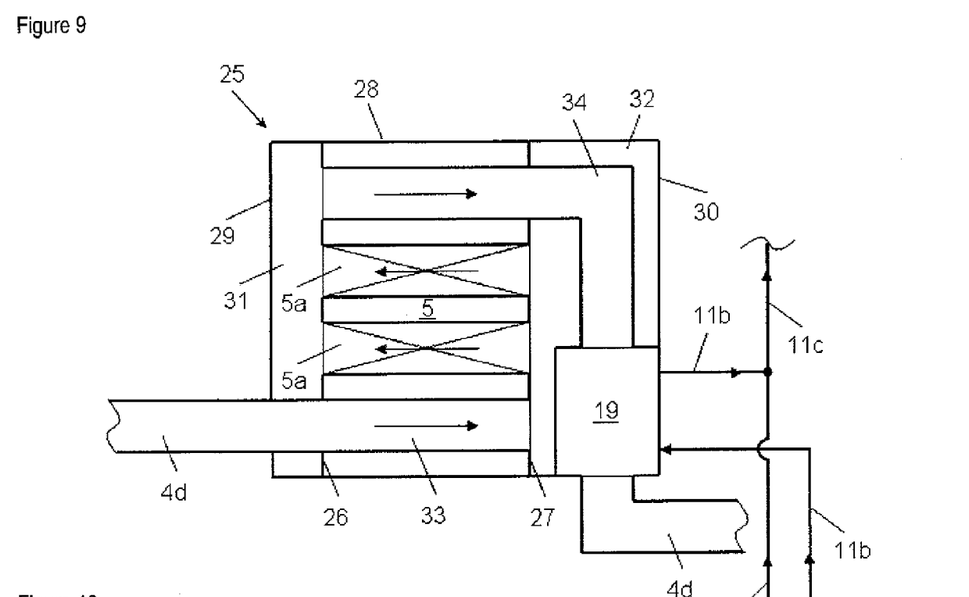
FIG. 9 is another alternative arrangement to FIGS. 7 and 8 for the exhaust gas heat exchanger in the exhaust train.
Figure 10:
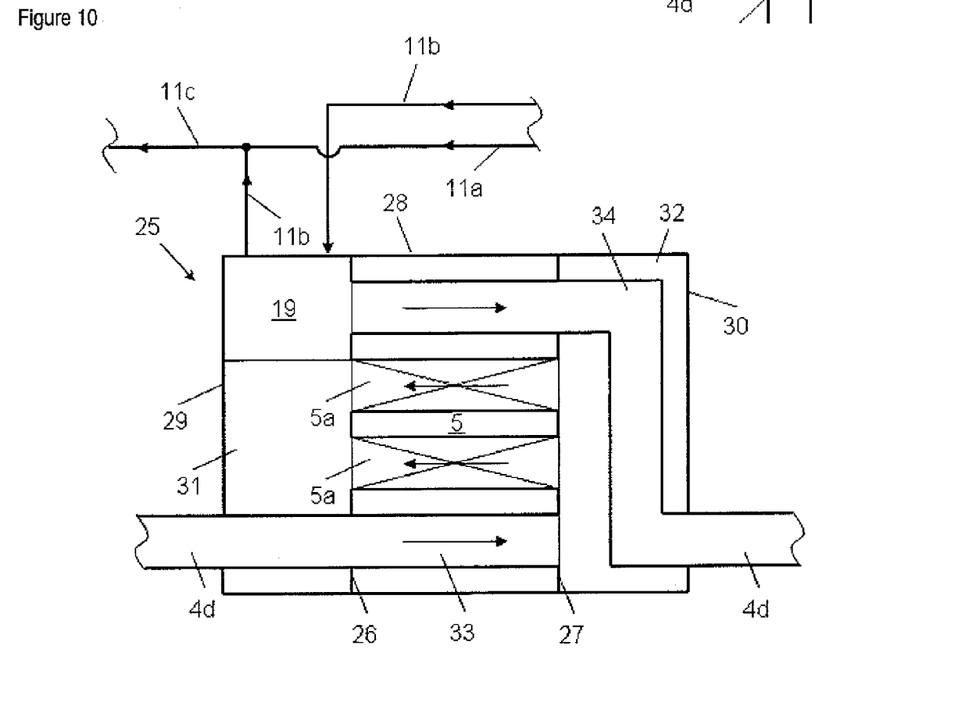
FIG. 10 is another alternative arrangement to FIGS. 7 to 9 for the exhaust gas heat exchanger.

The muffler 25, which is constructed substantial identically to that in FIG. 8 in principle, is used with the integrated exhaust gas aftertreatment device modules 5a in the embodiment according to FIG. 9. However, in this instance the exhaust gas heat exchanger 19 is arranged inside the muffler 25 rather than on the outer side. The supply and removal of the exhaust gas to and from the exhaust gas heat exchanger 19 is carried out via the end pipe 34. The exhaust gas heat exchanger 19 can be fastened to, or in, the end pipe 34 or to the inner side of the base 30 or of the outer surface 28. As an alternative to this arrangement in the inlet space 32, the exhaust gas heat exchanger 19 can also be arranged in the exhaust gas outlet space 31—as is shown in FIG. 10—at a location where it does not impede the influx of cleaned exhaust gas. At the output of the exhaust gas heat exchanger 19, the cleaned exhaust gas is removed from the muffler 25 via an end pipe 34.

Various further details concerning the heat recovery circuit 11 are described more fully in the following.

Figure 5:
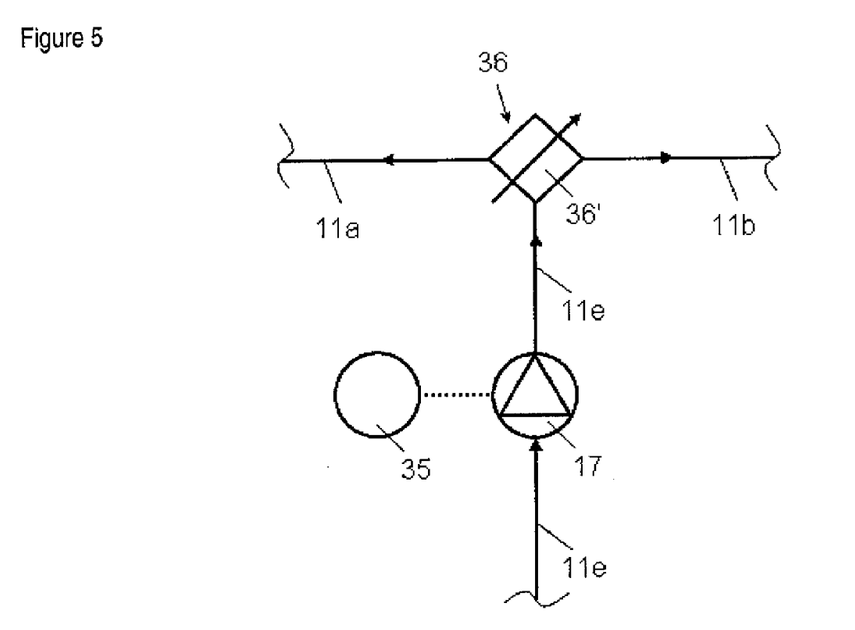
FIG. 5 is a schematic view of a valve unit for distributing the work medium into the two parallel branches of the heat recovery circuit.
Figure 6:
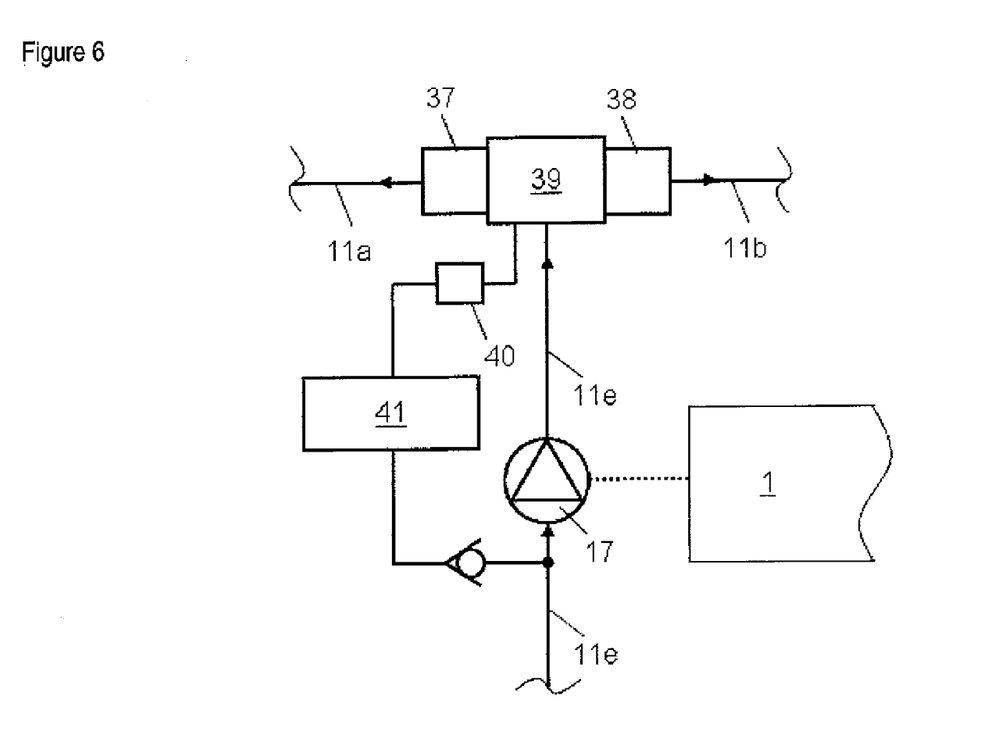
FIG. 6 is a schematic diagram of an alternative to the valve unit according to FIG. 5.
Figure 7:
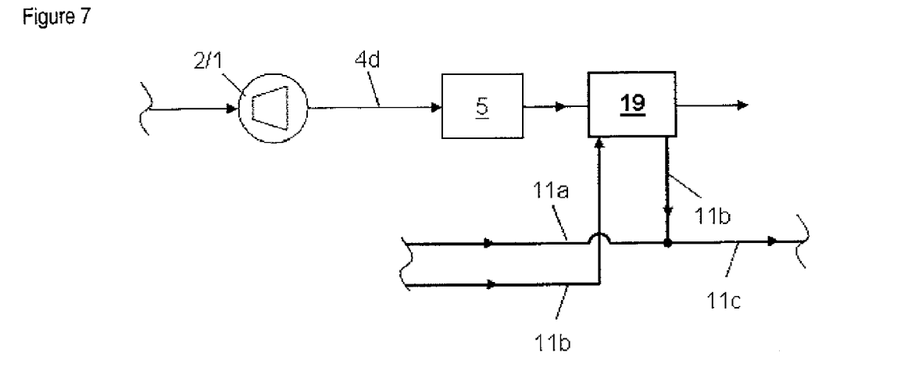
FIG. 7 is a variant arrangement for the exhaust gas heat exchanger in the exhaust train.

The internal combustion engine 1 can drive the pump 17 mechanically via a gear train or drive train (see FIGS. 1 and 3). Alternatively, the pump 17 can also be driven by an electric motor 35 (see FIG. 2). The work medium in the heat recovery circuit 11 is delivered by pump 17 to the valve unit 36 from which the two parallel branches 11a, 11b proceed. Two mass flows of work medium are generated in the two parallel branches 11a, 11b by the valve unit 36 independently from the available heat yield. Further, these two mass flows of work medium can be regulated independently from one another and independently from the speed of the internal combustion engine 1 or electric motor 35. In the electric motor drive of the pump 17, the valve unit 36 comprises, a mixing valve as shown in FIG. 5, which divides the mass flow of work medium delivered by the pump 17 in a regulated manner into two partial mass flows which are introduced into the two parallel branches 11a, 11b. When the mechanical drive of the pump 17 is formed by the internal combustion engine, the valve unit 36 as shown in FIG. 6 comprises, two flow control valves 37, 38, a pressure accumulator 39, and a pressure limiting valve 40. The mass flow of work medium to be supplied to the adjoining parallel branch 11a or 11b is removed from the pressure accumulator 39 by each flow control valve 37 and 38. In so doing, the pump 17 conveys work medium into the pressure accumulator 39 depending on the speed of the internal combustion engine 1. The excess amount of work medium is diverted to a compensating vessel 41 by the pressure-limiting valve 40. The valve unit 36 preferably generates two partial work medium flows by which the amounts of steam and the steam pressures that can be generated in the EGR heat exchanger 18 and exhaust gas heat exchanger 19 can be variably adjusted.

The work medium used in the heat recovery circuit 11, or at least a component thereof, has an evaporation temperature, which is suited to an efficient operation of the heat recovery circuit. Water or a water mixture can be used as work medium. Additions to the latter can have, e.g., anti-corrosion and anti-freeze properties. Alternatively, a hydrocarbon compound with a low boiling point or evaporation temperature can be used as work medium. Butane compounds and pentane compounds turn out to be particularly suitable for this purpose. A list of possible work media and their physical and chemical properties the shown in the following table:

| Medium | Molar mass | Critical point | | Boiling temperature ($10^5$ Pa) | Vaporization heat ($10^5$ Pa) | Slope of saturated steam curve | Decomposition at approx. |
|---|---|---|---|---|---|---|---|
| NH3 | 17 | 405.3 K | 11.33 MPa | 239.7 K | 1347 kJ/kg | negative | 750 K |
| Water | 18 | 647.0 K | 22.06 MPa | 373.0 K | 2256 kJ/kg | negative | |
| n-Butane C4H10 | 58.1 | 425.2 K | 3.80 MPa | 272.6 K | 383.8 kJ/kg | | |
| n-Pentane C5H12 | 72.2 | 469.8 K | 3.37 MPa | 309.2 K | 357.2 kJ/kg | | |
| C6H6 | 78.14 | 562.2 K | 4.90 MPa | 353.0 K | 438.7 kJ/kg | positive | 600 K |
| C7H8 | 92.1 | 591.8 K | 4.10 MPa | 383.6 K | 362.5 kJ/kg | positive | |
| R134a (HFC-134a) | 102 | 374.2 K | 4.06 MPa | 248.0 K | 215.5 kJ/kg | isentropic | 450 K |
| C8H10 | 106.1 | 616.2 K | 3.50 MPa | 411.0 K | 339.9 kJ/kg | positive | |
| R12 | 121 | 385.0 K | 4.13 MPa | 243.2 K | 166.1 kJ/kg | isentropic | 450 K |
| HFC-245fa | 134.1 | 430.7 K | 3.64 MPa | 288.4 K | 208.5 kJ/kg | | |
| HFC-245ca | 134.1 | 451.6 K | 3.86 MPa | 298.2 K | 217.8 kJ/kg | | |
| R11 (CFC-11) | 137 | 471.0 K | 4.41 MPa | 296.2 K | 178.8 kJ/kg | isentropic | 420 K |
| HFE-245fa | 150 | 444.0 K | 3.73 MPa | | | | |
| HFC-236fa | 152 | 403.8 K | 3.18 MPa | 272.0 K | 168.8 kJ/kg | | |
| R123 | 152.9 | 456.9 K | 3.70 MPa | 301.0 K | 171.5 kJ/kg | positive | |
| CFC-114 | 170.9 | 418.9 K | 3.26 MPa | 276.7 K | 136.2 kJ/kg | | |
| R113 | 187 | 487.3 K | 3.41 MPa | 320.4 K | 143.9 kJ/kg | positive | 450 K |
| n-Perfluoro-pentane C5F12 | 288 | 420.6 K | 2.05 MPa | 302.4 K | 87.8 kJ/kg | | |

The work medium, which is used, is completely converted from the liquid aggregate state to the vaporous aggregate state in the heat recovery circuit inside the EGR heat exchanger 18 and exhaust gas heat exchanger 19. The heat transfer in the EGR heat exchanger 18 brings about a highly efficient cooling of the recycling exhaust gas on the one hand and a complete vaporization of the work medium on the other hand. The heat transfer in the exhaust gas heat exchanger 19 provides for the most efficient possible cooling of the through-flowing exhaust gas on the one hand and, here again, a complete vaporization of the work medium on the other hand. The work medium present in vaporous aggregate state at the output of the two heat exchangers 18, 19 functioning as evaporators is then introduced into the expander 19 and converted by the latter into useful mechanical energy. The expander 19 can be, e.g., a thermal engine or a turbine installation by which the energy escaping in the evaporated work medium can be converted at least partially into rotational energy providing useful power and which communicates, e.g., with the internal combustion engine or a flow-generating generator or other power consumer either directly or via a drive train or gear train to introduce the generated useful energy.

Accordingly, the solution according to the invention provides a highly efficient cooling of the internal combustion engine 1 and of the charge air to be supplied to the latter and of the recycling exhaust gas, but also makes optimal use of the thermal energy of the exhaust gas at different locations for additional mechanical output on the one hand and, on the other hand, to minimize the amount of fuel burned in the internal combustion engine 1 while maintaining the same output and reduce environmental loading. Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A drive unit, comprising:
    an internal combustion engine;
    a first turbocharger of a two-stage charge system for the internal combustion engine, the first turbocharger having a low-pressure turbine and a low-pressure compressor, the low pressure turbine arranged in an exhaust train segment of the internal combustion engine;
    a second turbocharger of the two-stage charge system for the internal combustion engine, the second turbocharger having a high-pressure turbine and a high-pressure compressor the high-pressure turbine arranged in the exhaust train segment of the internal combustion engine;
    an intermediate charge air cooler arranged between the low-pressure compressor and the high-pressure compressor;
    a main charge air cooler arranged downstream of the high-pressure compressor;
    an exhaust gas discharge of the internal combustion engine configured to drive the high-pressure turbine and the low-pressure turbine;
    a cooling circuit comprising:
        two cooling sub-circuits, the two cooling sub-circuits configured to be one of hydraulically coupled and hydraulically decoupled;
        at least one coolant pump configured to circulate a coolant in at least one of the two cooling sub-circuits;
        a first heat exchanger configured to be cooled by ambient air is arranged in a first of the two cooling sub-circuits; and
        a second heat exchanger configured to be cooled by ambient air is arranged in the second cooling sub-circuit, the main charge air cooler and the intermediate charge air cooler being arranged downstream of the second heat exchanger arranged in the second cooling sub-circuit; and
    a heat recovery circuit hydraulically decoupled from the cooling circuit and comprising:
        at least one heat recovery pump;
        a plurality of heat exchangers including an EGR heat exchanger, an exhaust gas heat exchanger, and a condenser;
        a work medium configured to be circulated in the heat recovery circuit at an increased pressure by the at least one heat recovery pump, wherein a phase transition of the work medium from liquid aggregate state to vaporous aggregate state and back from vaporous aggregate state to liquid aggregate state is brought about in the plural heat exchangers;
        wherein the work medium is divided after the at least one heat recovery pump into a first parallel partial flow path and a second parallel partial flow path,
        the EGR heat exchanger through which recycle exhaust gas flows being arranged in the first parallel partial flow path and configured to change the work medium to the vaporous aggregate state;
        the exhaust gas heat exchanger through which exhaust gas downstream of the low-pressure turbine flows arranged in the second parallel partial flow path and configured to change the work medium to the vaporous aggregate state; and
        an expander into which the vaporous work medium from the exhaust gas heat exchanger and the EGR heat exchanger is fed, the expander configured to convert the vaporous work medium into useful mechanical energy,
        the condenser being arranged to receive the work medium from the expander, the condenser configured to return the work medium into the liquid aggregate state, the work medium from the condenser being fed back to the heat recovery circuit by the at least one heat recovery pump.

2. The drive unit according to claim 1, wherein the exhaust gas heat exchanger is arranged proximate to the low-pressure turbine in the exhaust train segment to utilize residual heat of exhaust gas exiting the low-pressure turbine.

3. The drive unit according to claim 1, wherein the heat recovery pump is driven mechanically by the internal combustion engine.

4. The drive unit according to claim 1, wherein the heat recovery pump is driven by an electric motor.

5. The drive unit according to claim 1, wherein the expander is one of a thermal engine and a turbine installation by which energy contained in the evaporated work medium is converted at least partially into rotational energy.

6. The drive unit according to claim 5, wherein the expander is operatively connected to one of the internal combustion engine and a flow-generating generator configured to draw useful power,
    wherein this operative connection is produced one of directly and indirectly via one of a drive train and a gear train to a driven shaft of the respective unit.

7. The drive unit according to claim 1, wherein compressed air generated by one of a compressor and a fan configured to draw air from an atmosphere is supplied to the condenser as coolant, the one of the compressor and fan being driven by one of a drive train of the internal combustion engine, a corresponding gear train of the internal combustion engine, and an electric motor.

8. The drive unit according to claim 7, wherein at least one additional heat exchanger through which air can flow is arranged at least one of in a feed line upstream of the condenser and downstream of the condenser in a line,
whereby an additional cooling effect is achieved by the at least one additional heat exchanger.

9. The drive unit according to claim 1, wherein the EGR heat exchanger is supplied with the recycle exhaust gas via an EGR line that branches off from an exhaust train segment connecting outlet-side headers of the internal combustion engine with an inlet of the high-pressure turbine.

10. The drive unit according to claim 9, wherein after the recycle exhaust gas flows through the EGR heat exchanger, the recycle exhaust gas is guided into a charge air line segment that produces a connection between the main charge air cooler and at least one of air inlets on the combustion engine side and a charge air collector line from which the air inlets proceed.

11. The drive unit according to claim 9, wherein
at least one additional heat exchanger is arranged downstream of the EGR heat exchanger, in a parallel branch of the second cooling sub-circuit configured to provide a further cooling of the exhaust gas flowing through the EGR line,
the recycle exhaust gas, after flowing through the at least one additional heat exchanger via the EGR line, is conducted into a charge air line segment configured to connect the main charge air cooler and at least one of air inlets on the combustion engine side and a charge air collector line from which the air inlets proceed.

12. The drive unit according to claim 9, wherein the recycle exhaust gas is supplied to the EGR heat exchanger via the EGR line and, after flowing through the EGR heat exchanger, is returned to at least one of air inlets on the combustion engine side and a charge air collector line from which the air inlets proceed.

13. The drive unit according to claim 1, wherein the condenser is arranged in one of the first cooling sub-circuit and the second cooling sub-circuit such that the coolant circulated therein is used for re-cooling and liquefying the work medium of the heat recovery circuit flowing through the condenser.

14. The drive unit according to claim 13, wherein the condenser is arranged in a line segment of the second cooling sub-circuit that one of
unites its output with one of the input of the at least one coolant pump and an input location provided in front of the at least one coolant pump on a suction side in a line segment of the first cooling sub-circuit connecting an output of the heat exchanger at least one coolant to the pump when the main charge air cooler and the at least one coolant intermediate charge air cooler are connected in series on a coolant side, and
unites both of its outputs either with one of the input of the at least one coolant pump and the input location provided in front of the at least one coolant pump on the suction side in the line segment of the first cooling sub-circuit connecting the output of the heat exchanger to the at least one coolant pump when the main charge air cooler and the at least one coolant intermediate charge air cooler are connected in parallel on the coolant side.

15. The drive unit according to claim 13, wherein the condenser is arranged in a line segment of the first cooling sub-circuit that connects the output of the heat exchanger to the input of the at least one coolant pump.

16. The drive unit according to claim 15, wherein, when the condenser is connected in the line segment of the first cooling sub-circuit, the second cooling sub-circuit configured to branch downstream of the pump from a line segment that leads to the internal combustion engine, and a line segment that rejoins that part of the line segment of the first cooling sub-circuit that connects the output of the condenser to the at least one coolant pump.

17. The drive unit according to claim 1, wherein the work medium in the heat recovery circuit is delivered by the heat recovery pump to a valve unit from which the two parallel partial flow paths proceed,
two mass flows of work medium are generated in the parallel partial flow paths by the valve unit independently from an available heat yield and,
the two mass flows of work medium are regulated independently from one another and from the speed of the internal combustion engine or electric motor.

18. The drive unit according to claim 17, wherein, when the internal combustion engine forms a mechanical drive of the heat recovery pump, the valve unit comprises two flow control valves, a pressure accumulator, and a pressure limiting valve,
wherein the work medium is delivered into the pressure accumulator by the heat recovery pump based at least in part on a speed of the internal combustion engine,
excess work medium is diverted to a compensating vessel by the pressure limiting valve, and a partial flow of work medium is removed from the pressure accumulator by a respective one of the two control valves and supplied to the adjoining parallel partial flow path.

19. The drive unit according to claim 17, wherein, when the heat recovery pump is driven by an electric motor, the valve unit comprises a mixing valve configured to divide the mass flow of work medium delivered by the pump in a regulated manner into two partial mass flows which are to be introduced into the two parallel partial flow paths.

20. The drive unit according to claim 19, wherein water or a water mixture is used as work medium in the heat recovery circuit, and a material added to the water mixture has at least one of anti-corrosion and anti-freeze properties.

21. The drive unit according to claim 1, wherein the exhaust gas heat exchanger is arranged in an exhaust train segment adjoining an output of the low-pressure turbine downstream of an exhaust gas aftertreatment device,
whereby the exhaust gas heat exchanger is configured to utilize residual heat of this exhaust gas exiting the low-pressure turbine.

22. The drive unit according to claim 21, wherein the exhaust gas aftertreatment device and the exhaust gas heat exchanger are arranged directly behind one another in the exhaust train segment.

23. The drive unit according to claim 21, wherein the exhaust gas heat exchanger is arranged after the exhaust gas aftertreatment device at distance from the exhaust gas aftertreatment device in the exhaust train segment.

24. The drive unit according to claim 21, wherein the exhaust gas aftertreatment device comprises:
a plurality of exhaust gas aftertreatment modules integrated into a muffler that extend between an exhaust gas inlet chamber and an exhaust gas outlet chamber,
wherein the exhaust gas is fed into the exhaust gas inlet chamber via an inlet connection piece forming a portion of the exhaust train segment adjoining the output of the low-pressure turbine,
the exhaust gas that is cleaned after flowing through the exhaust gas aftertreatment modules is conducted out of the exhaust gas outlet chamber via an end pipe out of the muffler; and the exhaust gas heat exchanger is arranged one of inside and outside the muffler.

25. The drive unit according to claim 24, wherein the exhaust gas heat exchanger is fastened to the outside of the muffler, the exhaust gas supplied to the exhaust gas heat exchanger via the end pipe.

26. The drive unit according to claim 24, wherein the exhaust gas heat exchanger is arranged inside the muffler in the exhaust gas inlet space, and the exhaust gas is supplied to the exhaust gas heat exchanger via the end pipe.

27. The drive unit according to claim 24, wherein the exhaust gas heat exchanger is arranged inside the muffler inside the exhaust gas outlet chamber, the exhaust gas is guided out of the muffler via the end pipe after flowing through the exhaust gas heat exchanger.

* * * * *